United States Patent [19]

Cohen et al.

[11] Patent Number: 4,717,095

[45] Date of Patent: Jan. 5, 1988

[54] RAM AIR TURBINE INDEXING MECHANISM

[75] Inventors: Mordehy Cohen, Rockford; David A. Kezar, Loves Park, both of Ill.

[73] Assignee: Sundstrand Corporation, Rockford, Ill.

[21] Appl. No.: 743,087

[22] Filed: Jun. 10, 1985

[51] Int. Cl.⁴ .............................................. B64D 41/00
[52] U.S. Cl. .................................................... 244/58
[58] Field of Search ................. 292/173; 244/58, 7 R, 244/137 A; 416/142, 14

[56] References Cited

U.S. PATENT DOCUMENTS

| | | | |
|---|---|---|---|
| 1,733,891 | 10/1929 | Loudy | 244/58 |
| 3,069,116 | 12/1962 | Ward | 244/58 |
| 3,149,678 | 9/1964 | Chilman et al. | 244/58 |
| 3,273,459 | 9/1966 | Lardin | 244/137 A |
| 3,957,229 | 5/1976 | Davis | 244/53 R |
| 3,986,686 | 10/1976 | Girard | 244/7 A |
| 4,411,596 | 10/1983 | Chilman | 416/51 |
| 4,676,458 | 6/1987 | Cohen | 244/58 |

Primary Examiner—Galen Barefoot
Assistant Examiner—Lynn M. Fiorito
Attorney, Agent, or Firm—Wood, Dalton, Phillips, Mason & Rowe

[57] ABSTRACT

An indexing mechanism for use with a deployment mechanism of a ram air turbine having front and rear linkages pivotally connected at one of their ends within the storage bay of an aircraft and their other ends pivotally connected to a housing for the ram air turbine, for moving the ram air turbine between a stowed and deployed position. The improved indexing mechanism includes a spring-loaded detent member coupled to the housing which engages a slot in the turbine hub preventing rotation of the turbine hub and blade when the ram air turbine is in the stowed position. Coupled to the rear linkage adjacent the pivot joint at the ram air turbine is a cam member which moves through an arc as the ram air turbine is deployed, said cam member engaging the spring-loaded detent member to release the turbine hub and blade as the ram air turbine nears the fully deployed position.

11 Claims, 5 Drawing Figures

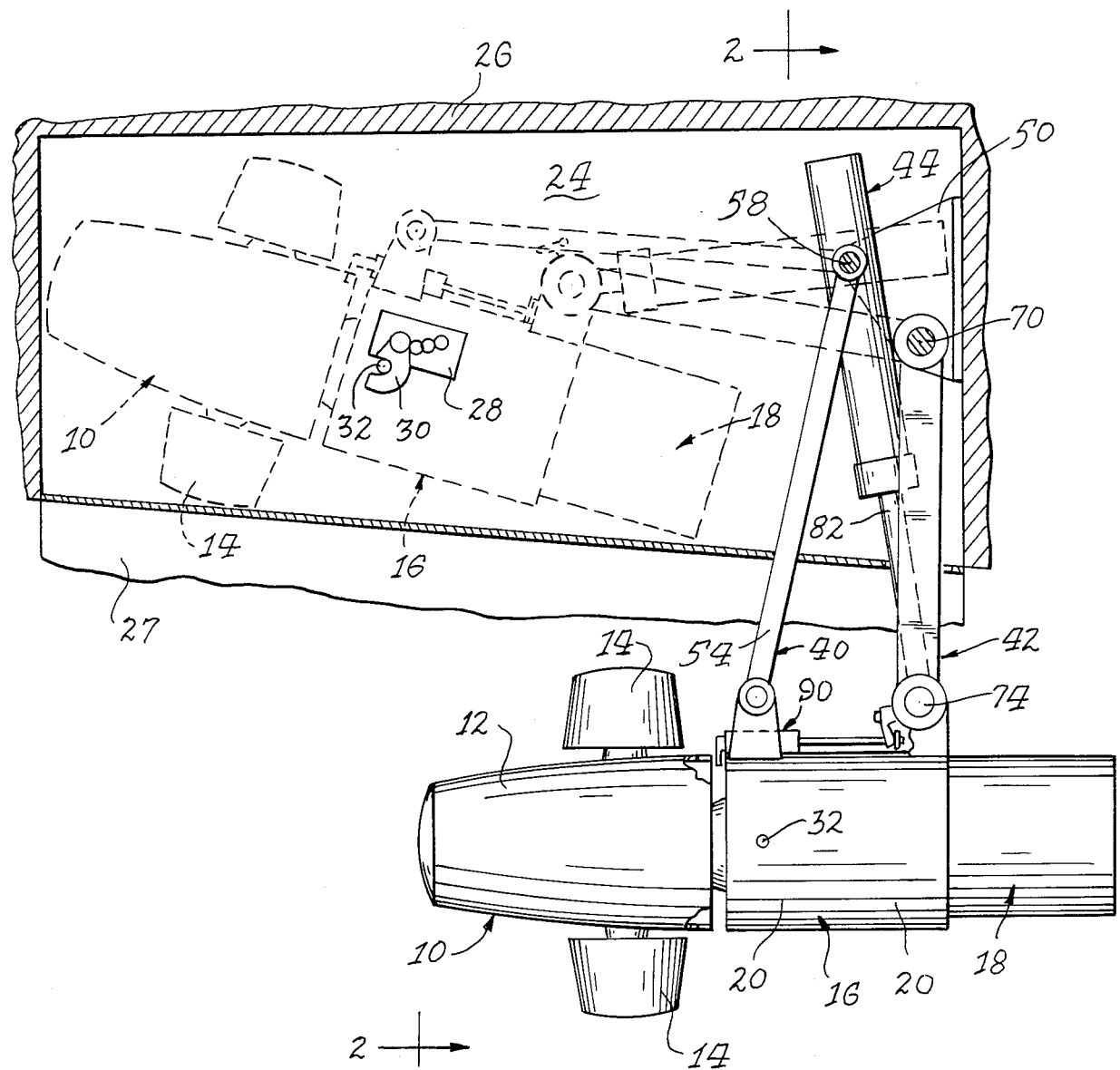

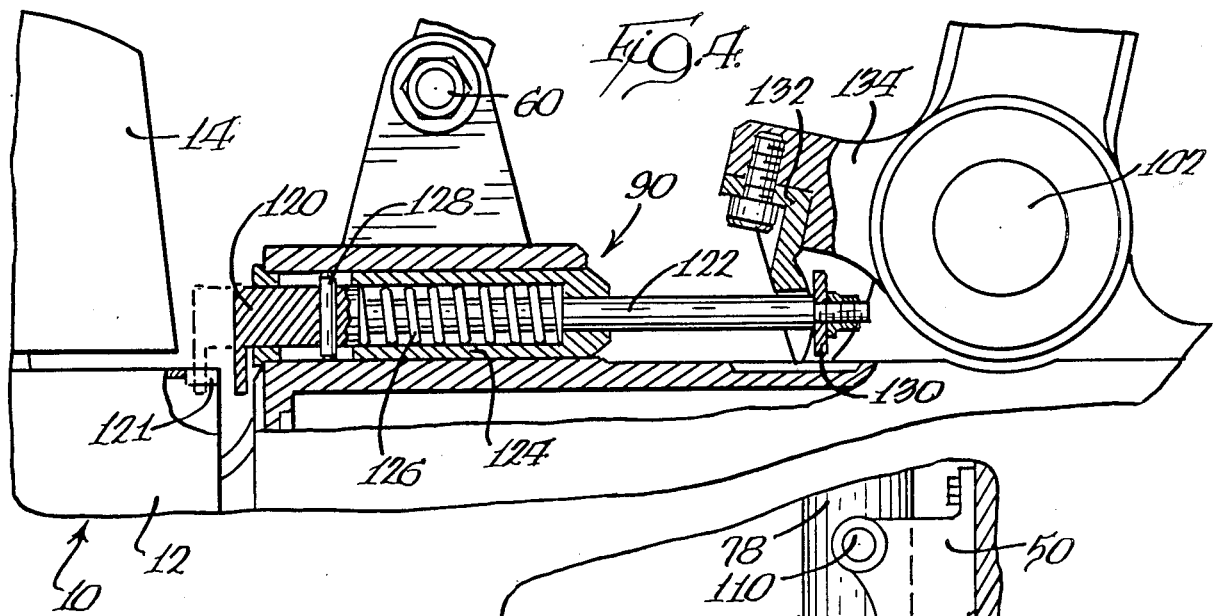
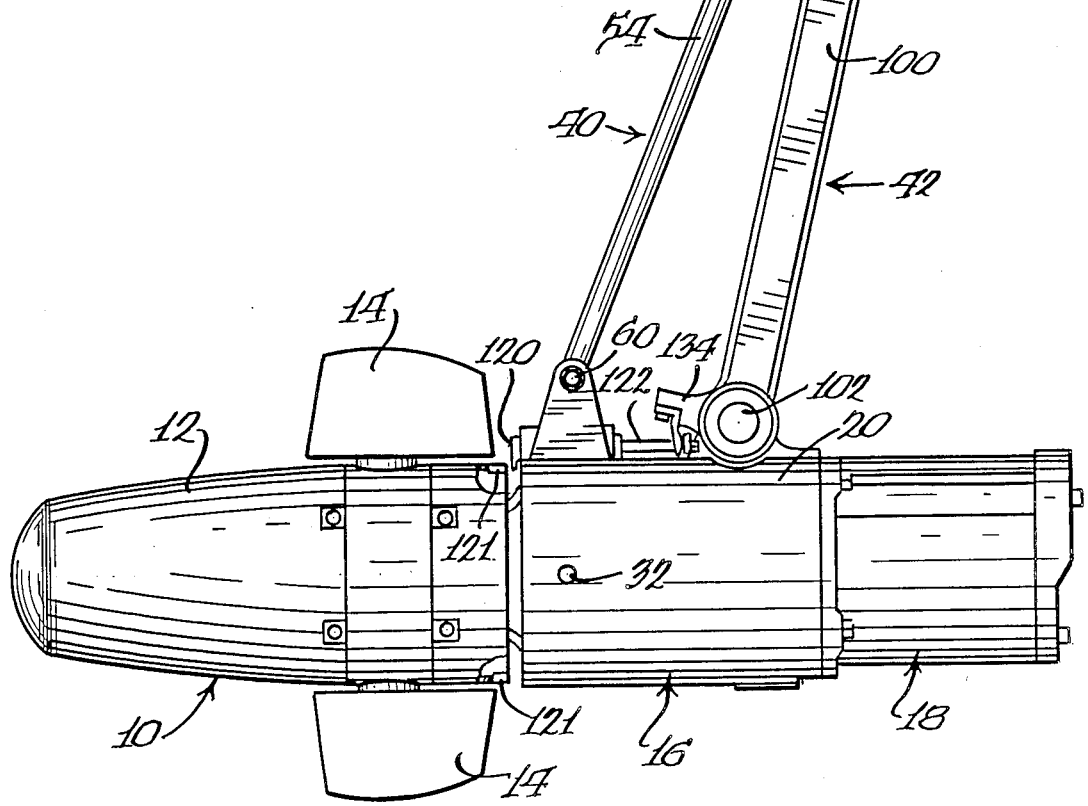

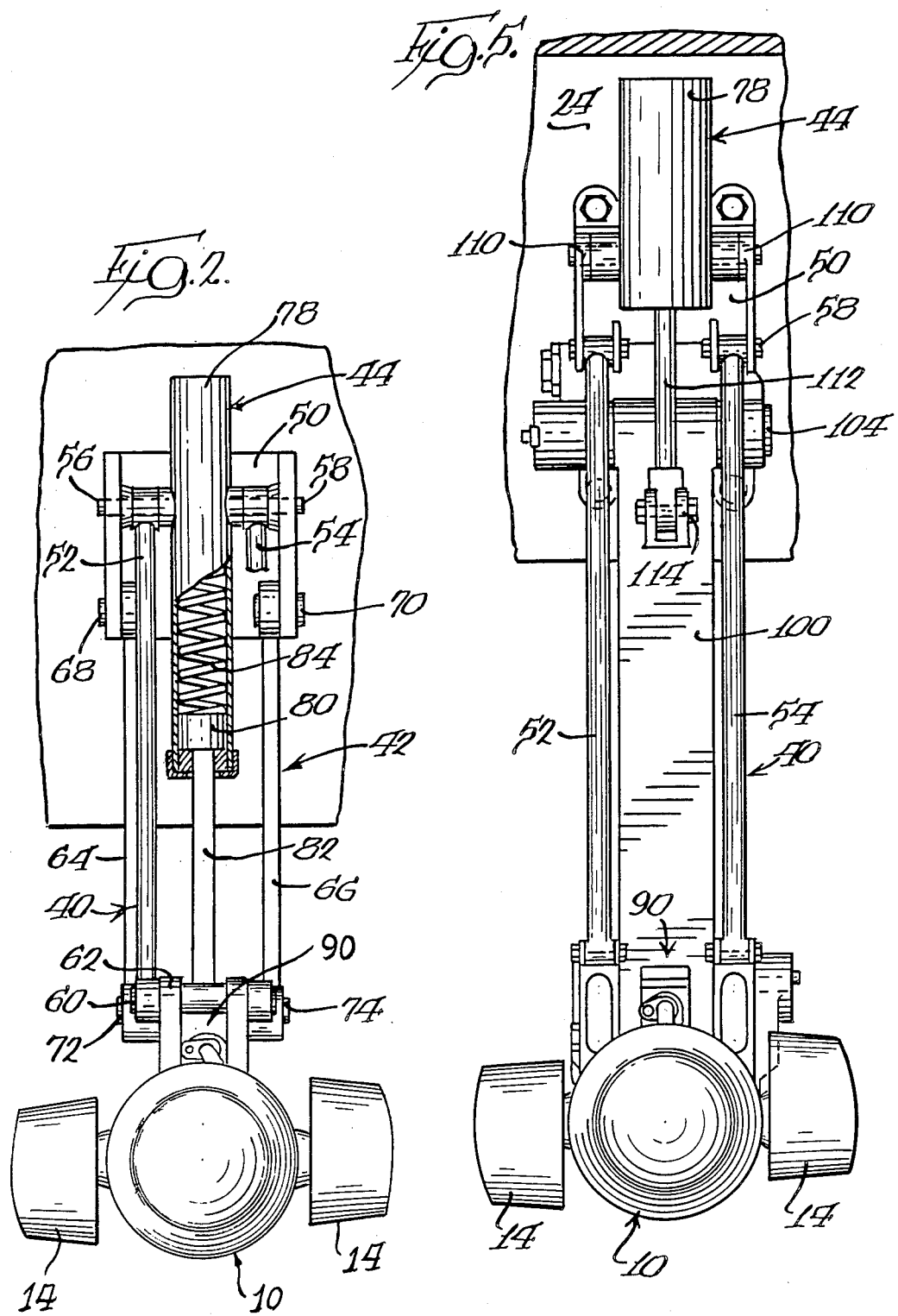

4,717,095

RAM AIR TURBINE INDEXING MECHANISM

TECHNICAL FIELD

This invention relates to an improvement in an indexing mechanism used with a deployment mechanism of a ram air turbine.

BACKGROUND OF THE INVENTION

For many years, aircraft have included, as standard equipment, a back-up power source for use in times of power outage in the main power system. This standard equipment has been in the form of an air driven turbine or fan which has a normal stowed position within the fuselage of the aircraft and which can be moved to a deployed position in the airstream, thereby making use of the relative speed of the aircraft through the ambient air to cause the turbine blades to rotate. The ram air turbine can have either electrical generating gear or a hydraulic pump or both which are powered by the rotation of the blades due to the movement through the air.

The Cohen application Ser. No. 685,475, filed Dec. 24, 1984, owned by the assignee of this application, discloses a deployment mechanism for a ram air turbine with front and rear linkages pivotally connected at one of their ends within the storage bay of the aircraft and their other ends pivotally connected to the ram air turbine and includes a spring loaded deployment actuator operable to move the ram air turbine from stowed position. Front and rear linkages are constructed and mounted at pivot joints to provide a primarily linear motion of the ram air turbine in moving between stowed and deployed position to provide for fast deployment and also minimize the volume of the storage bay and the area of the access doors thereto.

The Chilman Pat. No. 4,411,596 owned by the assignee of this application, discloses an indexing mechanism to orient the ram air turbine blades in a predetermined rotative position when the ram air turbine is stowed. As seen in FIG. 1 of the Chilman patent, the locking of the blades in the position shown therein effectively reduces the width of the ram air turbine and, thus, the required width for the storage bay. The indexing mechanism has been a spring-loaded detent mounted on a support, such as the support 13 of the Chilman patent, and which is released when the ram air turbine reaches deployed position by movement of a cable connected to the detent and to some operative mechanism at the pivot mounting of the strut within the storage bay of the aircraft.

SUMMARY OF THE INVENTION

The present invention relates to an improved indexing mechanism for use with a deployment mechanism of a ram air turbine. The indexing mechanism maintains the turbine hub and blades in a particular rotative position when the ram air turbine is in the stowed position. Additionally, the indexing mechanism automatically releases the turbine hub when the ram air turbine nears the fully deployed position without the use of remotely operable cables or other structure.

In achieving the foregoing, the ram air turbine is pivotally mounted on pivotal forward and rear struts for movement between stowed and deployed positions. The blades are held against rotation, when the ram air turbine is stowed, by a spring-loaded detent member engaged in a slot in the turbine hub, and the indexing mechanism automatically releases the blades for rotation as the ram air turbine nears the fully deployed position. This release is achieved by a cam structure acting on the detent member as the ram air turbine moves relative to its mounting structure.

A primary object of this invention is to provide an indexing mechanism for use with a deployment mechanism of a ram air turbine operable by relative movement between the ram air turbine and the strut supporting structure.

Still another object of the invention is to provide an indexing mechanism for use with a deployment mechanism of a ram air turbine carried by an aircraft and usable to drive a mechanism, such as a generator or a pump and having a stowed position inside a storage bay of the aircraft and a deployed position outside the aircraft to extend longitudinally of the aircraft and the airstream, a mounting base positionable at an end of the storage bay, a front linkage having at least one front link extending between the ram air turbine and said mounting base and pivotally connected thereto, a rear linkage having at least one rear link extending between the ram air turbine and the mounting base and pivotally connected thereto at locations rearwardly of the pivot connections of the front linkage, comprising a spring-loaded detent member mounted to the housing of the generator or pump which engages a slot in the hub of a turbine to prevent rotation of the turbine hub and blade when the ram air turbine is in the stowed position, a cam member fixed to said rear linkage adjacent the pivot connection at the ram air turbine which moves through an arc as the ram air turbine is deployed, the cam member engaging the detent member as the ram air turbine nears its fully deployed position resulting in the detent member automatically releasing the turbine hub allowing the turbine hub and blades to turn freely.

BRIEF DESCRIPTION OF THE DRAWINGS

FIG. 1 is a side elevational view of the ram air turbine and deployment mechanism shown in deployed position in full line and in stowed position in broken line;

FIG. 2 is an end elevational view, taken generally along the line 2—2 in FIG. 1, with parts broken away;

FIG. 3 is a view similar to FIG. 1 of a second embodiment of the invention with the ram air turbine shown in deployed position;

FIG. 4 is a fragmentary view of part of the structure shown in FIG. 3 on an enlarged scale and with parts broken away to illustrate an indexing mechanism; and FIG. 5 is a view similar to FIG. 2 of the structure shown in FIG. 3.

DESCRIPTION OF THE PREFERRED EMBODIMENTS

In the embodiment of FIGS. 1 and 2, a ram air turbine, indicated generally at 10, is enclosed by a cover 12 and mounts a series of variable pitch blades 14 for rotation about the longitudinal axis of the ram air turbine. When in deployed position in association with an aircraft in flight, the airstream resulting from movement of the aircraft through the air cause the blades 14 to rotate the ram air turbine. The ram air turbine has associated with it a generator, indicated generally at 16, and a pump, indicated generally at 18.

The generator is connectable into the main power system for supplying electrical power when there is a power outage in the main power system. The hydraulic pump 18 is connectable into a hydraulic power circuit for supplying hydraulic power when there is a failure in the main hydraulic power system. Although both a generator and pump are shown, it will be evident that, if desired, only one or the other of the pump and generator may be used with the ram air turbine.

The generator 16 has a housing 20 which mounts bearing means for rotatably supporting a drive shaft of the ram air turbine, with this drive shaft being connected to components of the generator 16 and the pump 18. This general structure of a ram air turbine and associated power supply means is known in the art, with one showing thereof being in the aforesaid Chilman Pat. No. 4,411,596 and the disclosure thereof is incorporated herein by reference.

The ram air turbine has a stowed position within a storage bay 24 of an aircraft, with aircraft components defining the storage bay shown in section at 26. Access to the storage bay 24 is provided by means of a pair of hinged access doors 27 which are closed when the ram air turbine is in stowed position and which can open preparatory to deployment of the ram air turbine. A portion of one open door 27 is shown in FIG. 1.

The ram air turbine is held in stowed position by means of a conventional up-lock 28 having a catch pawl 30 which coacts with a pin 32 on the housing 20 of the generator. When the ram air turbine is to be deployed, the access doors 27 are opened and a signal from the aircraft cockpit, either mechanically through a cable or electrically, releases the catch pawl 30 and the weight of the ram air turbine together with the actuator load will cause the catch pawl to pivot counterclockwise, as seen in FIG. 1, out of engagement with the pin 32.

The deployment mechanism for the ram air turbine comprises three major components. These components are a front linkage, indicated generally at 40, a rear linkage, indicated generally at 42, and a spring-loaded deployment actuator, indicated generally at 44. The deployment mechanism is constructed and arranged to have pivotal movement to achieve primarily a linear motion of the ram air turbine 10 in moving from the stowed position to the deployed position. With this primarily linear motion, there is only a limited amount of rotation of the ram air turbine about a transverse axis to enable fast deployment of the ram air turbine, as well as minimizing the stowing volume of the storage bay 24 and minimizing the area of the access doors 27.

The primary components of the deployment mechanism are all pivotally mounted within the storage bay 24 and may be directly connected thereto. However, as shown, a mounting base 50 is secured to a wall of the aircraft structural component. The front linkage 40 has a pair of laterally spaced-apart front links 52 and 54 pivoted to the mounting base at one of their ends at pivot joints provided by pivot pins 56 and 58. These links are slender in cross section. The opposite ends of the front links 52 and 54 are pivotally connected to the generator housing 20 at pivot joints provided by a pivot pin 60 passing through a bracket structure 62 fixed to the generator housing 20. The rear linkage 42 has a pair of laterally spaced-apart rear links 64 and 66 of slender cross section pivoted at their upper ends to the mounting base 50 at pivot joints provided by pivot pins 68 and 70. The opposite ends of the rear links 64 and 66 are pivotally connected to the generator housing 20 at pivot joints provided by pivot pins 72 and 74 mounted in bracket structure supported by the generator housing 20.

The spring-loaded deployment actuator 44 has a cylinder 78 pivotally connected intermediate its ends to the mounting base 50 by the pins 56 and 58 associated with the front linkage 42 and movably mounts a piston 80 having a piston rod 82 extendable therefrom and which is pivotally connected to the generator housing 20 by the pivot pins 72 and 74 associated with the rear linkage 42.

A spring 84 within the cylinder is compressed when the ram air turbine is in stowed position whereby, upon release of the ram air turbine for deployment by release of the up-lock, the spring will immediately cause the ram air turbine to move toward the deployed position. Although not shown, it is conventional to have a hydraulic dashpot structure within the cylinder 78 which will retard the rate of movement of the ram air turbine as it approaches the deployed position in order to have the ram air turbine move into the final deployed position without any shock to the structure.

The front and rear linkages have their upper pivot joints and lower pivot joints related whereby the front and rear links extend generally parallel to each other and normal to the ram air turbine when the ram air turbine is in a deployed, generally horizontal position and also generally parallel when in stowed position, as seen in broken line in FIG. 1. This structural arrangement includes having the rear links 64 and 66 of a shorter length than the front links 52 and 54 and having the pivot joints of the rear linkage below and rearwardly of the upper pivot joints for the front links.

As previously mentioned, the primary advantages include the fast deployment with minimum volume of the storage bay 24 and the size of the access doors 27 because of the primarily linear movement of the ram air turbine between stowed and deployed positions. After use of the ram air turbine, the aircraft will be on the ground and the ram air turbine can be manually repositioned in the stowed position shown in broken line in FIG. 1.

It is previously known to locate the ram air turbine blades 14 in a predetermined rotative position to fit within the storage bay, with the blades being held in this position by an indexing mechanism which is released when the ram air turbine moves to deployed position. An improved indexing mechanism located at a pivot joint is indicated generally at 90 and has a detent extendable to hold the blades in a predetermined rotative position and which can be released by relative movement between the rear linkage 42 and the generator housing 20. A structure of this type is more particularly described in connection with the embodiment of FIGS. 3 to 5.

In the embodiment of FIGS. 3 to 5, the structure the same as that shown in the embodiment of FIGS. 1 and 2 has been given the same reference numeral.

The embodiment of FIGS. 3 to 5 differs in one primary respect from the embodiment of FIGS. 1 and 2 by having the rear linkage 42 formed as a single strut 100 which is pivoted at a pivot joint 102 to the generator housing 20. The opposite end of the strut 100 is pivoted to the mounting base 50 at 104. The pivot joints of the strut 100 are located relative to the pivot joints of the front linkage 40 generally in the same manner as in the embodiment of FIGS. 1 and 2. The spring-loaded deployment actuator 44 has a separate pivot to the mounting base 50, as indicated at 110, and has a piston rod 112 pivotally connected at 114 to the strut 100 near the upper end thereof. The deployment mechanism of the embodiment of FIGS. 3 to 5 also provides for primarily a linear motion of the ram air turbine in moving from a stowed position, not shown, to the deployed position, shown in FIG. 3.

The indexing mechanism 90 has a spring-loaded detent member 120 movable between the released position, shown in full line in FIG. 4, and a detent position, shown in broken line, in which the ram air turbine blades 14 are held against rotation by coaction with one of two slots 121, in the rotatable cover 12 of the ram air turbine. The detent member 120 has a rod 122 associated therewith extending through a case 124 secured to the generator housing 20 and having a spring chamber in which a spring 126 is mounted. Slots in the case 124 coact with a pin 128 to preclude rotation of the detent member 120. The spring 126 normally urges the detent member 120 to the detent position and the detent member can be moved to the released position by coaction between a disc 130, carried at the end of the rod 122, and a cam member 132. The cam member 132 is carried on an arm 134 integral with the strut 100 and, therefore, moves through an arc as the ram air turbine is deployed. When the ram air turbine is in stowed position, the cam member 132 is at a distance from the disc 130 and the spring 126 is operative to maintain the detent member 120 in detent position, as shown in broken line in FIG. 4. As the ram air turbine approaches deployed position, the cam member 132 is moving through an arc and the bifurcated end thereof moves to either side of the rod 122 and engages the left-hand face of the disc 130, as seen in FIG. 4. The final relative movement between the cam member 132 and the disc 130 causes the rod 122 to move to the right and bring the detent member 120 to release position.

The indexing mechanism of the present invention maintains the turbine hub and blades in their locked position when the ram air turbine is in the stowed position. As the ram air turbine is deployed, the indexing mechanism automatically releases the turbine hub and blades, without the use of remotely operable cables or other structures, relative to the position of the ram air turbine, as the ram air turbine nears the fully deployed position.

We claim:

1. In a deployment mechanism for a ram air turbine movable between stowed and deployed positions relative to a mounting base associated with an aircraft, with a plurality of links pivotally connected at pivot joints at one of their ends to said base and pivotally connected at their other ends at pivot joints to the ram air turbine, the ram air turbine including a rotatable turbine hub and blades, and indexing mechanism comprising means coupled to the ram air turbine for releasably holding the rotatable turbine hub and blades in a particular rotative position when stowed, and means coupled to one of said links adjacent the pivot joint thereof at the ram air turbine and responsive to pivotal movement of the link relative to the ram air turbine for coacting with said holding means to release the turbine hub and blade.

2. An indexing mechanism as defined in claim 1 wherein the holding means includes a spring-loaded detent member to prevent rotation of the turbine hub when it is stowed.

3. An indexing mechanism as defined in claim 2 including a slot in the turbine hub which is engaged by the detent member when the ram air turbine is in a stowed position.

4. An indexing mechanism as defined in claim 3 further comprising a second slot in the turbine hub which alternately may be engaged by the detent member when the ram air turbine is in its stowed position.

5. An indexing mechanism as defined in claim 4 for a turbine hub having two blades wherein the two slots in the turbine hub are set 180° apart.

6. An indexing mechanism as defined in claim 1 wherein the indexing mechanism acts to automatically release the turbine hub when the ram air turbine nears the fully deployed position.

7. An indexing mechanism as defined by claim 1 wherein the coacting means include a cam member coupled to one of said links, which moves through an arc as the ram air turbine is deployed.

8. An indexing mechanism as defined in claim 7 wherein the holding means further include a disc coupled to a spring-loaded detent member, which is acted upon by the cam member to release the turbine hub when the ram air turbine is in the deployed position.

9. An indexing mechanism as defined in claim 2 wherein the detent member includes a pin member and a plurality of slots which act in conjunction to preclude rotation of the detent member.

10. In a deployment mechanism for a ram air turbine movable between stowed and deployed positions relative to a mounting base associated with an aircraft, with a plurality of links pivotally connected at pivot joints at one of their ends to said base and pivotally connected at their other ends at pivot joints to the ram air turbine, an indexing mechanism for releasably holding a rotatable turbine hub and blades in a particular rotative position when stowed, said indexing mechanism comprising two slots in said turbine hub, a spring-loaded detent member to engage one of said slots to prevent rotation of said turbine hub when it is stowed, said detent member including a rod which extends through a case secured to a housing on the ram air turbine, said case including slots which coact with a pin to prevent rotation of said detent member, said rod further including a disc at the end away from said turbine hub, a cam member coupled to one of said links adjacent the pivot joints of one of said links at the ram air turbine which moves through an arc as the ram air turbine is deployed, said cam member engaging said disc to act on said detent member and release said turbine hub when the ram air turbine nears the fully deployed position.

11. In a deployment mechanism for a ram air turbine movable between stowed and deployed positions relative to a mounting base associated with an aircraft, the deployment mechanism including at least one link pivotally connected to said base and pivotally connected at a pivot joint to the ram air turbine, an indexing mechanism for releasably holding a rotatable turbine hub and blades in a particular rotative position when stowed comprising, an engageable surface on said turbine hub, a detent member including a movable rod on a housing on the ram air turbine engageable with said engageable surface to prevent rotation of said turbine hub when it is stowed and having a disc at an end remote from said turbine hub, a cam member coupled to said link adjacent the pivot joint at the ram air turbine and which moves through an arc as the ram air turbine is deployed, said cam member engaging said disc to pull on said rod and release said turbine hub when the ram air turbine nears the fully deployed position.

* * * * *